Sept. 5, 1950     T. E. McFALL     2,521,300
PISTON RING
Filed July 14, 1947     2 Sheets—Sheet 1
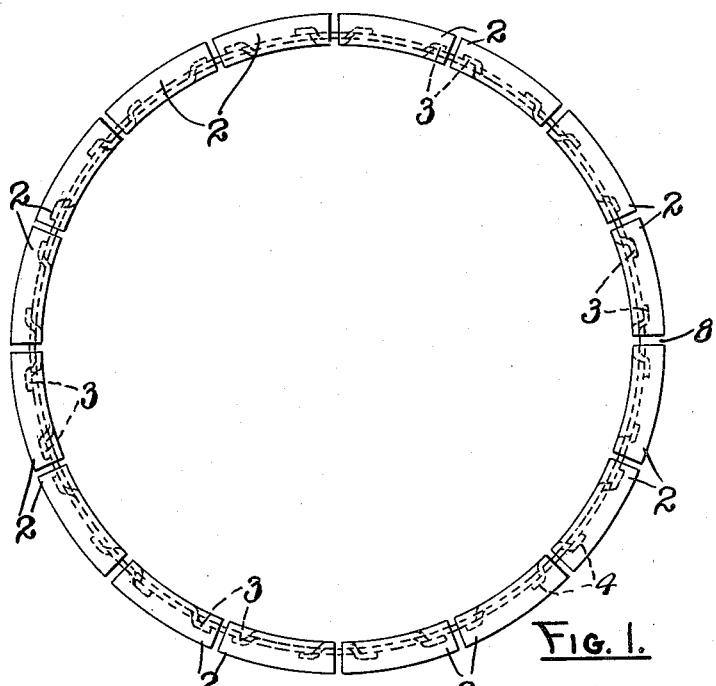
Fig. 1.
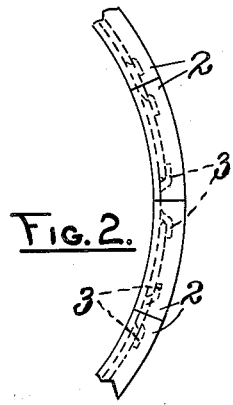
Fig. 2.
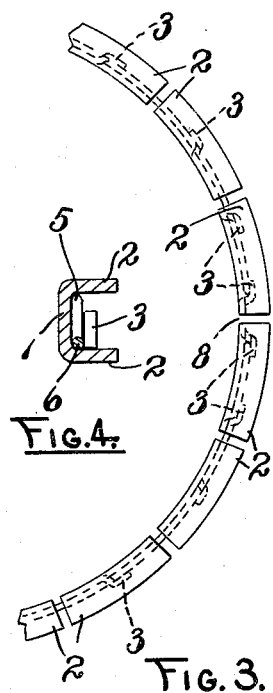
Fig. 3.
Fig. 4.
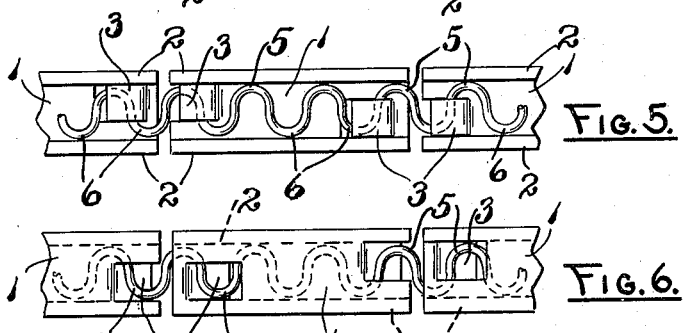
Fig. 5.
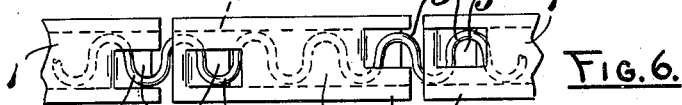
Fig. 6.
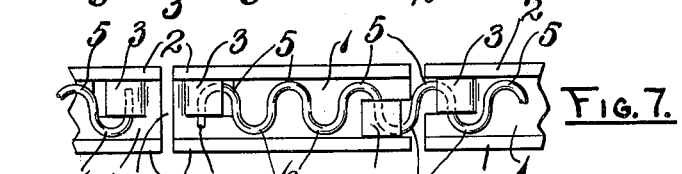
Fig. 7.
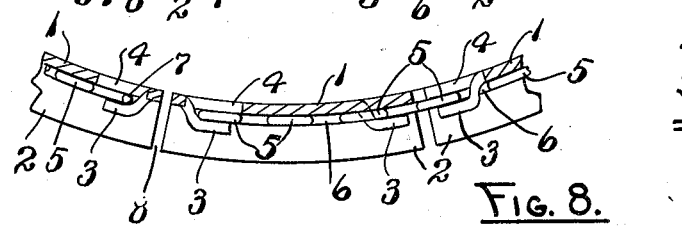
Fig. 8.
INVENTOR
THURLOW E. McFALL
BY Linerame and
Van Antwerp
ATTORNEYS

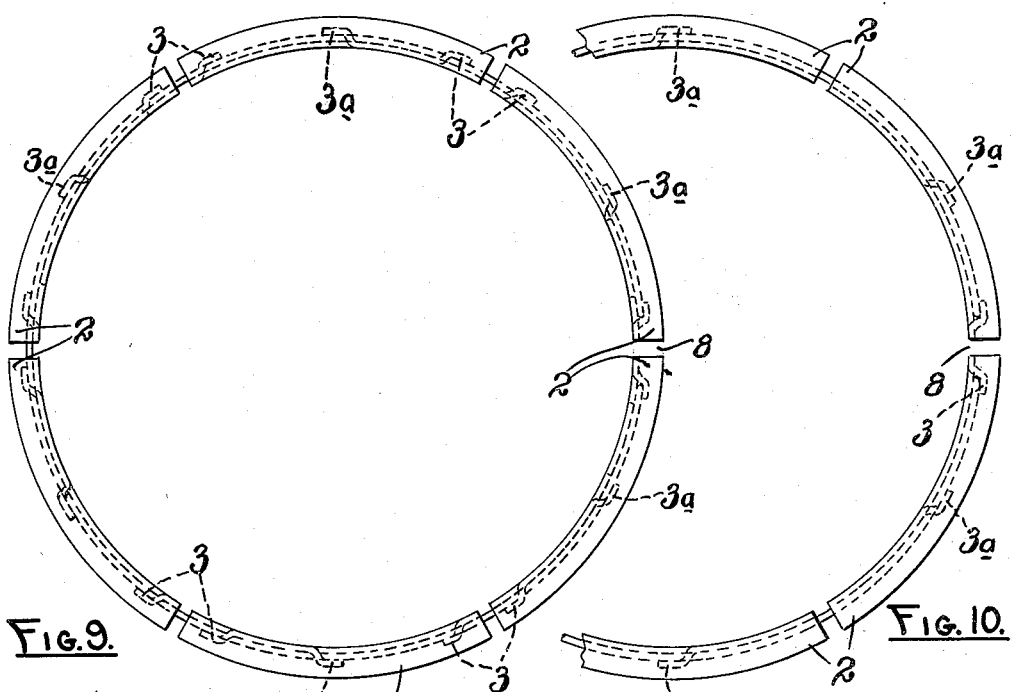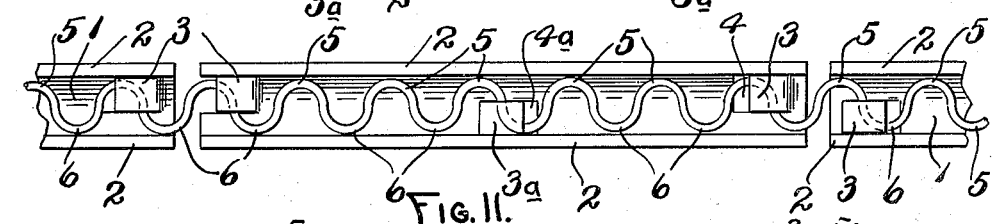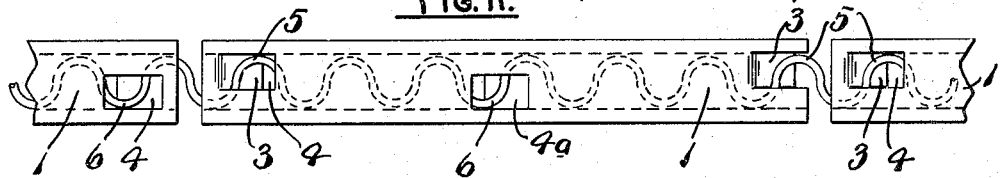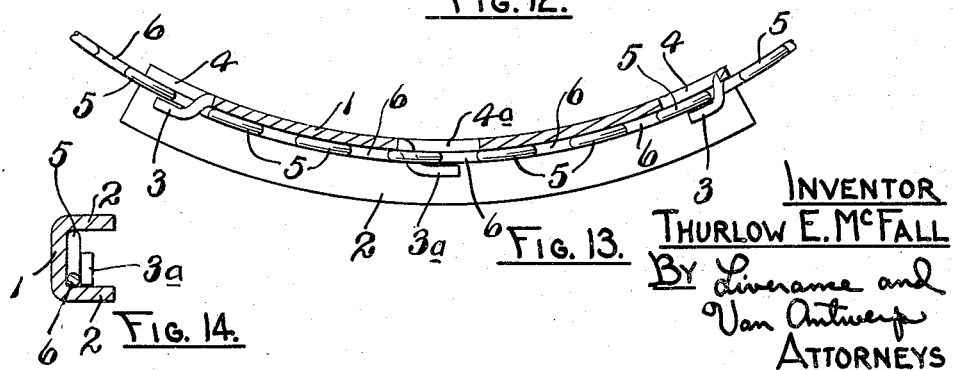

Patented Sept. 5, 1950

2,521,300

UNITED STATES PATENT OFFICE 2,521,300

PISTON RING

Thurlow E. McFall, Sparta, Mich., assignor to Muskegon Piston Ring Company, Muskegon, Mich., a corporation of Michigan Application July 14, 1947, Serial No. 760,742

6 Claims. (Cl. 309—45)

The present invention relates to a novel structure of piston ring, of the type known as oil rings, which are used in the oil drainage ring grooves of pistons in internal combustion engines.

I have developed, in the disclosed structure of the present invention, a novel form of piston ring, which comprises a plurality of arcuate ring sections connected together by a continuous surrounding spring member which, when free and unstrained, has a length such that with the ring sections mounted thereon in succession, the assembled ring may have an interior diameter such that the ring may pass over the top or head of a piston to a ring groove, and with the sections at adjacent ends separated short distances from each other. When the ring is reduced in diameter and forced into the piston ring groove by a surrounding cylinder wall, the spring is longitudinally or circumferentially shortened and adjacent ends of the ring sections brought into close proximity. There is a generation in the spring of a resilient force which is transmitted through the ring sections, at their bearing surfaces where they ride upon the cylinder wall, an outward radial pressure whereby a seal against the passage of oil from below to the engine combustion chamber is prevented. Furthermore, the ring scrapes excess oil from the cylinder wall and delivers it to the ring groove from which it is drained to the engine crankcase in an old and well known manner.

With the present invention the number of ring sections in a ring may be greatly varied, but in all cases the connection of the ring sections to the single length spring is by use of holding tongues which are pressed from the sheet metal of which the ring sections are made. With my invention the ring sections preferably are of a thin gauge steel in channel form, which are readily produced in economical, large quantity production by means of dies on a punch press. The retaining and connecting members by means of which the sections are assembled and secured with the spring, are readily pressed and struck from the ring sections, so that assembly for the completed ring requires merely the attachment of the sections to the spring member which is housed within the channels of the sections.

An understanding of the invention may be had from the following description, taken in connection with the accompanying drawings, in which, Fig. 1 is a plan view of a piston ring made in accordance with my invention, showing the ring free and unrestrained, Fig. 2 is a fragmentary plan, illustrating the ring sections when they are brought at their ends close together as in service, Fig. 3 is a plan similar to Fig. 1, showing a slight modification in structure, Fig. 4 is a transverse vertical section, somewhat enlarged, through the ring, Fig. 5 is a fragmentary enlarged elevation of the ring shown in Fig. 1, Fig. 6 is a fragmentary enlarged inside elevation thereof, Fig. 7 is an elevation similar to Fig. 5, showing a variation in tongue location in the two end sections of the ring, one at each side of its open parting, Fig. 8 is a horizontal longitudinal section through the structure illustrated in Fig. 7 between its upper and lower flanges, Fig. 9 is a plan similar to Fig. 1, showing a piston ring in accordance with the invention, in which longer ring sections and a lesser number of them are used, Fig. 10 is a fragmentary similar plan, with a slight modification in structure relating to the spring retaining and connecting tongues formed with the ring sections, Fig. 11 is a fragmentary enlarged outer elevation of the ring, Fig. 12 is a similar inner elevation, Fig. 13 is a longitudinal horizontal section therethrough, and Fig. 14 is a transverse vertical section through a side of the ring.

Like reference characters refer to like parts in the different figures of the drawings.

As shown, the ring sections, preferably of a thin gauge steel, are in channel form and are arcuate in shape whereby, when a number of them are located in successive end to end relation, a circular ring is provided adapted to be received in a piston ring groove. The channel sections each have a vertical web 1 and upper and lower outwardly extending flanges 2, the outer bearing edges of which, in a completed ring, form a circle of substantially the same diameter as the inner diameter of a cylinder in which the ring is to be used. Each of the sections, from its web, has tongues 3 struck from the end portion of the web and pressed outwardly into the channel between its flanges. As shown in Fig. 1, one of these tongues is near each end of the web of each of the channels. The tongues might be struck from the upper portion of the web or the lower portion thereof as shown, at either one or both ends of the sections. Preferably, alternate sections have the tongues extending from the webs in opposite directions. Where the tongues were pressed from the webs, openings as at 4 are provided, venting the ring sections for passage of oil.

The spring is completed by a single length member of spring material, formed with alternate upper and lower bends or corrugations 5 and 6 and adapted to be received in the channels of the ring sections, with the tongues covering portions of the spring member where said member comes to and spans the gaps between adjacent ends of successive sections. The ends of the spring member terminate in legs 7, which are held within the tongues 3 at the adjacent ends of the end sections, one at each side of an open gap 8 provided at one side of the ring.

The circular length of the spring member is capable of reduction by a straining and compression of the corrugations of the spring member, with a development of tension force in the bends 5 and 6 thereof, as is obvious. The sections have a limited freedom of movement longitudinally upon the spring member, so that adjacent ends of successive sections on contracting the circumferential length of the spring member are brought substantially into end to end engagement as shown in Fig. 2. This occurs when the ring is compressed and contracted within the confines of a cylinder wall of the proper dimension to receive it, thereby holding the ring in a groove of a piston. The tension force developed tends to force the ring sections at the outer curved bearing edges of the flanges 2 against the cylinder wall, and each ring section is in a measure independently pressed outwardly so that the ring as a whole readily conforms to the inner wall surface of a cylinder, even though such surface may be irregular and out of round at different portions of its length.

In the form shown in Figs. 1, 2, and 5 to 8, inclusive, each of the ring sections is provided with two of the tongues 3, one adjacent each end. As shown in Fig. 3, only the two end sections, one at each side of the open gap 8, are thus provided, the others having a single tongue 3 struck from each web substantially midway between the ends thereof, and with the tongues of said intermediate sections alternately extending in opposite directions from the webs of the sections with which they are integrally connected.

In Figs. 9 to 14 inclusive, the number of sections which make up a ring is shown as markedly decreased, with the sections longer than in the structures first described. In Fig. 9 the tongues 3 are shown one at each end of each web, with also a middle tongue 3a struck from the web so that the retaining engagement with the spring member will not be at too far separated distances. The intermediate tongues 3a leave oil passing openings 4a in the webs of the sections as shown. In Fig. 10 there is a slight modification in structure. All of the sections except the two end sections, one at each side of the parting 8, have only the single intermediate tongue 3a, while the two end sections have such intermediate tongue and also a tongue 3 on each section at adjacent ends. In all of the forms, substantially the same structure, attaining the same results in the same manner, appears.

The structure described is practical and easily produced. The tongues may be struck in the formation of the channel sections and the assembly with the spring member is simply, easily and readily performed. The connection by means of said tongues to the spring member is a sufficiently loose one that relative movement of the ring sections with respect to each other, to space them limited distances at their adjacent ends when the ring is in a free and unrestrained condition, or to bring the adjacent ends of successive sections substantially to each other, may take place. The alternate or opposite extension of the tongues on alternate sections around the ring is of value in having the ring sections separate from each other with greater uniformity than they would if all tongues extended in the same direction from their respective webs, and therefore prevent bunching of sections together or too far end separations of some of them.

The invention is defined in the appended claims and is to be considered comprehensive of all forms of structure coming within their scope.

I claim:

1. A piston ring comprising, a plurality of arcuate ring sections located in end to end successive alinement to provide a circular ring when adjacent ends of said ring sections are close together, each of said ring sections being of sheet metal having a channel cross section with a vertical web and outwardly extending upper and lower flanges, the web of each of said sections having an outwardly extending tongue struck therefrom for a short distance and a free end portion spaced from and substantially paralleling the web, and a spring member of generally circular form comprising a circular length of material corrugated with vertically positioned loops alternately open at their upper and lower ends located around all of the ring sections and with loops of the spring member between said tongues and the webs of their respective flanges.

2. A piston ring comprising, a plurality of successively alined arcuate ring sections of sheet metal having channel cross section, each with a vertical web and upper and lower outwardly extending flanges, each of said webs having a pair of tongues struck therefrom, one adjacent each end of each section, and extending outwardly from said web for a short distance and terminating in a free end portion substantially parallel to and spaced a short distance from said web, and a spring member of generally circular outline having a plurality of successive vertical loops alternately closed at upper and lower ends located around all of the ring sections between the flanges thereof, loops of the spring member being between said tongues and the webs of the sections.

3. A structure as defined in claim 2, the tongues on each of said sections having their free end portions extending in the same direction, and each of said tongues being of a less width than the web width between the inner sides of the flanges of said section and located at one longitudinal edge, closely adjacent a flange of the section from which struck.

4. A structure as defined in claim 3, said tongues on each of the sections having free end portions extending in the same direction, and the tongues on one section having their free end portions extending in the opposite direction from those of the next successive section.

5. A piston ring comprising, a plurality of alined end to end ring sections providing a substantially circular ring when adjacent ends of successive sections are substantially together, a circumferentially expansible and contractible spring member of substantially circular outline against which the successive ring sections are located, and tongues extending a short distance from the ring sections, and terminating in a free end portion substantially paralleling the lengths of the ring sections, between which and said ring sections intermediate portions of the spring member are received for mounting the sections upon the spring member, permitting limited longitudinal movement of the ring sections toward and away from each other at adjacent ends upon circumferential contraction and expansion, respectively, of the spring member, each of said ring sections being formed of sheet metal having a vertical web and an outwardly extending flange with the ring sections located within the said spring member, and said tongues extending from said webs in an outward direction.

6. A piston ring comprising, a plurality of alined end to end ring sections providing a substantially circular ring when adjacent ends of successive sections are substantially together, a circumferentially expansible and contractible spring member of substantially circular outline against which the successive ring sections are located, and tongues extending a short distance from the ring sections, and terminating in a free end portion substantially paralleling the lengths of the ring sections, between which and said ring sections intermediate portions of the spring member are received for mounting the sections upon the spring member, permitting limited longitudinal movement of the ring sections toward and away from each other at adjacent ends upon circumferential contraction and expansion, respectively, of the spring member, said spring member comprising a single length of spring material corrugated to provide successive vertically U-shaped loops, alternately open at their upper and lower sides, said loops of said spring member being located between the tongues and said webs, from which the tongues extend, and means for anchoring the ends of said spring member near the adjacent ends of two successive ring sections, between which there is an open parting.

THURLOW E. McFALL.

REFERENCES CITED

The following references are of record in the file of this patent:

UNITED STATES PATENTS

| Number | Name | Date |
|---|---|---|
| 1,918,707 | Mellor | July 18, 1933 |
| 2,239,703 | Crawford | Apr. 29, 1941 |
| 2,280,744 | Bowers | Apr. 21, 1942 |
| 2,319,098 | Zahodiakin | May 11, 1943 |
| 2,346,897 | Bowers | Apr. 18, 1944 |